(12) United States Patent
Gleghorn et al.

(10) Patent No.: US 7,958,790 B2
(45) Date of Patent: Jun. 14, 2011

(54) BIAXIAL LOAD CELL WITH HIGHLY ANISOTROPIC FORCE RESOLUTIONS

(75) Inventors: Jason Gleghorn, Ithaca, NY (US); Lawrence Bonassar, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 500 days.

(21) Appl. No.: 11/536,405

(22) Filed: Sep. 28, 2006

(65) Prior Publication Data

US 2007/0068283 A1  Mar. 29, 2007

Related U.S. Application Data

(60) Provisional application No. 60/721,641, filed on Sep. 29, 2005.

(51) Int. Cl.
*G01L 1/04* (2006.01)
*G01N 3/56* (2006.01)

(52) U.S. Cl. ........ 73/862.632; 73/9; 73/10; 73/862.634; 73/862.627; 73/862.621

(58) Field of Classification Search .............. 73/862.625–862.633, 150 A, 9–10
See application file for complete search history.

(56) References Cited

U.S. PATENT DOCUMENTS

| | | | | | |
|---|---|---|---|---|---|
| 4,657,097 | A | * | 4/1987 | Griffen | 177/211 |
| 4,854,494 | A | * | 8/1989 | von Raben | 228/102 |
| 5,142,424 | A | * | 8/1992 | Hatamura | 360/244.2 |
| 5,795,990 | A | * | 8/1998 | Gitis et al. | 73/9 |
| 6,324,918 | B1 | * | 12/2001 | Gitis et al. | 73/862 |
| 6,363,798 | B1 | * | 4/2002 | Gitis et al. | 73/862.391 |
| 6,418,776 | B1 | * | 7/2002 | Gitis et al. | 73/10 |
| 6,457,249 | B1 | * | 10/2002 | Corghi | 33/554 |

* cited by examiner

*Primary Examiner* — Lisa M Caputo
*Assistant Examiner* — Jonathan Dunlap
(74) *Attorney, Agent, or Firm* — Miller, Matthias & Hull, LLP (57) ABSTRACT

A load cell for measuring extremely low level, anisotropic biaxial loads is disclosed. The system includes at least one load cell of a specific geometry and dimension which, when mounted, provides a rotationless system accurately transmitting both normal and shearing strains to strain gauges mounted thereon. More specifically, by shaping the load cell so as to concentrate the strains imposed thereon, detection of extremely minute loads, such as coefficients of friction, can be measured.

25 Claims, 9 Drawing Sheets

BIAXIAL LOAD CELL WITH HIGHLY ANISOTROPIC FORCE RESOLUTIONS

CROSS-REFERENCE TO RELATED APPLICATION

This application is a non-provisional application claiming the priority benefit under 35 USC 119(e) of provisional U.S. Patent Application No. 60/721,641, filed on Sep. 29, 2005.

FIELD OF THE DISCLOSURE

The present disclosure generally relates to measurement devices, and more particularly relates to stress and strain measurement systems.

BACKGROUND OF THE DISCLOSURE

When external forces are applied to a stationary object, stress and strain in that object result. In general, stress is the internal resistance force of the object, while strain is the displacement and deformation that result. More specifically, strain is defined as the amount of deformation per unit length of an object when a load is applied. It can be calculated by dividing the total deformation of the original length by the original length of the object.

Over time, many devices have been devised to measure strain which itself can be either compressive or tensile. One simple type of strain gauge detects a change in an electrical characteristic of the object placed under strain be it in the form of capacitance, inductance, or resistance. If the strain of a particular composition is to be measured, the strain gauge itself is typically mounted to the material by epoxy bonding techniques or the like. Accordingly, when forces applied to the material are to be measured, a resulting strain is necessarily transmitted to the strain gauge and thus any change in its electrical characteristic will in turn be usable in determining the strain of the material being measured.

In one particular area of current interest, the properties of biological articular cartilage need to be measured. This is particularly beneficial in research being conducted with respect to osteoarthritis, since if the characteristics of the cartilage and its interaction with the lubrication provided by the human body, can be determined, advances in medical technology such as treatments for osteoarthritis can be made. Research has shown that the articular cartilage is naturally lubricated through a protein found in synovial fluid called lubricin. Further research may show the serviceable life for the cartilage may be increased if the protein structure can be modified or altered with synthetic agents. However, a difficulty encountered with measuring such materials and thus being able to accurately test agents and lubricants is that their coefficients of function are so small, current measurement technology is insufficient. In addition, such materials have extreme aspect ratios and typically exhibit highly anisotropic characteristics.

In light of the foregoing, a need exists for a newly developed load cell able to measure loads in both a normal and shearing direction, to eliminate the torsional effects of the measuring beam on the data, to provide a rotationless mounting system for the beam, and to concentrate the stress for the biaxial measurements such that measurements of extremely low loads can be detected.

SUMMARY OF THE DISCLOSURE

In accordance with one aspect of the disclosure, a biaxial load cell is disclosed able to measure extremely low coefficients of function and achieve highly anisotropic load resolution in at least two directions. Specifically, the load cell is able to measure frictional coefficients of articular cartilage which are on the order of 0.001.

In accordance with another aspect of the disclosure, a load cell is disclosed that can be used to measure biaxial loads in many different applications In accordance with one aspect of the disclosure, one cell is disclosed which includes a tower, a beam extending from the tower, a strain gauge mounted on the beam, and a processor connected to the strain gauge.

In accordance with another aspect of the disclosure, a load cell measurement system is disclosed which comprises a platform, a moveable table mounted on the platform, and a plurality of load cells extending upwardly from the platform In accordance with another aspect of the disclosure, the load cell measurement system is disclosed which comprises a platform, a moveable table mounted on the platform, a plurality of load cells extending upwardly from the platform, each of the load cells including a tower extending upwardly from the platform, a beam extending from the tower, strain gauges, and a processor. The beam includes a base, a tapered section extending from the base, and an arm extending from the tapered section. Each of the base, tapered section, and arm include cut-out sections, the base including top, central and bottom strips. The strain gauges are mounted on the top, central and bottom strips while the processor is connected to the strain gauges In accordance with a still further aspect of the disclosure, a load cell is disclosed having a base, a tapered section extending from the base, and an arm extending from the tapered section, the aim being of a lesser width than the base, the base, tapered section, and arm each including cut-out sections.

These and other aspects and features of the disclosure will become mole readily apparent upon reading the following detailed description when taken in conjunction with the accompanying drawings.

BRIEF DESCRIPTION OF THE DRAWING

FIG. 11 is a graphical representation of shearing and normal forces versus time as measured by a load cell constructed in accordance with the teachings of this disclosure While the present disclosure is susceptible to various modifications and alternative constructions, certain illustrative embodiments thereof have been shown in the drawings and will be described below in detail. It should be understood, however, that there is no intention to limit the present invention to the specific forms disclosed, but on the contrary, the intention is to covet all modifications, alternative constructions, and equivalents falling within the spirit and scope of the present invention.

DETAILED DESCRIPTION OF THE DISCLOSURE

Figure 1:
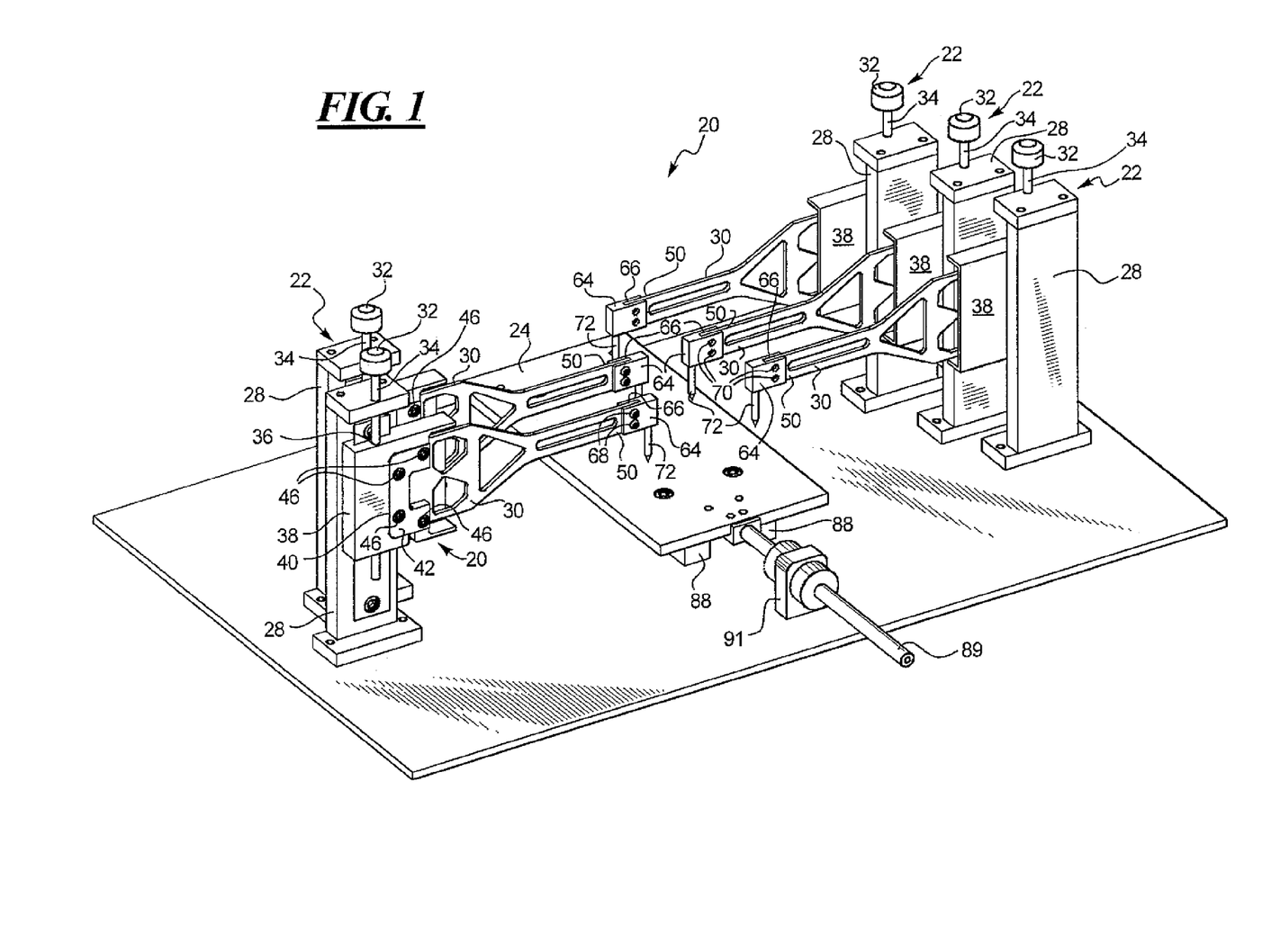
FIG. 1 is a perspective view of a measurement system constructed in accordance with the teachings of the disclosure and using multiple load cells.

Referring now to FIG. 1, a measurement system constructed in accordance with the teachings of the disclosure is generally referred to by reference numeral 20. While the system 20 will be described herein in connection with measuring coefficients of function in articular cartilage, it is to be understood that the system 20, particularly the load cell described in further detail herein, can be used in many other applications including, but not limited to, testing material strengths, fatigue points, durability and the like. In fact, the load cell can be used in any situation where there is a need to measure extremely low strain loads and/or biaxial loads which are very anisotropic.

In addition, while the system 20 illustrated herein depicts a total of five different measurement instruments 22, it is to be understood that the teachings of the disclosure can be used in conjunction with measurement systems employing only one or any other number of instruments 22. In fact, it is a unique benefit of the present disclosure that using a single measurement system 20, multiple readings can be simultaneously taken For example, in the sample indicated above, if the coefficient of friction of biological cartilage is to be measured, in the embodiment depicted in FIG. 1, five different samples of cartilage could be provided on the measurement table 24 and using a different load cell 22 for each sample (not shown) upon movement of table 24, measurements of each sample can be taken. As one of ordinary skill in the art will readily understand, such an advance will greatly expedite the measurement and research process, as well as reduce the expense of construction and measurement. Again, function coefficient measurement is but one example of how the disclosed technology can be employed.

Referring again to FIG. 1, as shown therein, the measurement system 20 may include one or more individual measurement instruments 22 positioned to measure items placed upon table 24. Each instrument 22 may include a mounting towel 28 from which a load cell 30 orthogonally extends. The mounting towers 28 may include adjustment mechanisms 32 to adjust the relative height of the load cell 30 to the table 24. Such adjustment mechanisms could be provided in a variety of fashions including the threaded rod 34 and threaded thru-hole 36 arrangement depicted in FIG. 1. In so doing, the rod 34 extends through a threaded hole 36 provided in carriage 38 and upon rotation of rod 34, carriage 38 is carried up and down mounting tower 28. In one embodiment, the threaded rod may be provided as a compound screw formed from two screws of slightly different pitches and soldered together. This allows, in such an embodiment, resolution of 200 micrometers per revolution of the screw. In still a further embodiment, a motor such as, but not limited to, a servomotor may be used with a closed-loop feedback system to automatically translate the load cell 30 up and down, thus allowing the instrument 22 to work in either load or displacement control.

Attached to the carriage 38 is the load cell 30. In older to securely attach the load cell 30 to the carriage 38, it can be seen that the carriage 38 includes a recess 40 sized to receive a proximal end 42 of the load cell 30. Such nesting of the load cell 30 within the carriage 38 ensures accurate positioning A mounting plate 44 is then positioned over the proximal end 42 and, with one of more fasteners 46, the mounting plate. In so doing, the load cell 30 is attached securely to the carriage 38. In the depicted embodiment, four thru-holes 48 (see FIG. 7) are provided in the proximal end 42 of the load cell 30, with the fasteners 46 being threaded screws countersunk therethrough, but other attachment mechanisms, including but not limited to, unitary construction, welding, adhesives, and the like are possible. Moreover, any number of mounting arrangements can be employed to position the load cell 30 as needed with the above-mentioned towel configuration being only one example.

Figure 7:
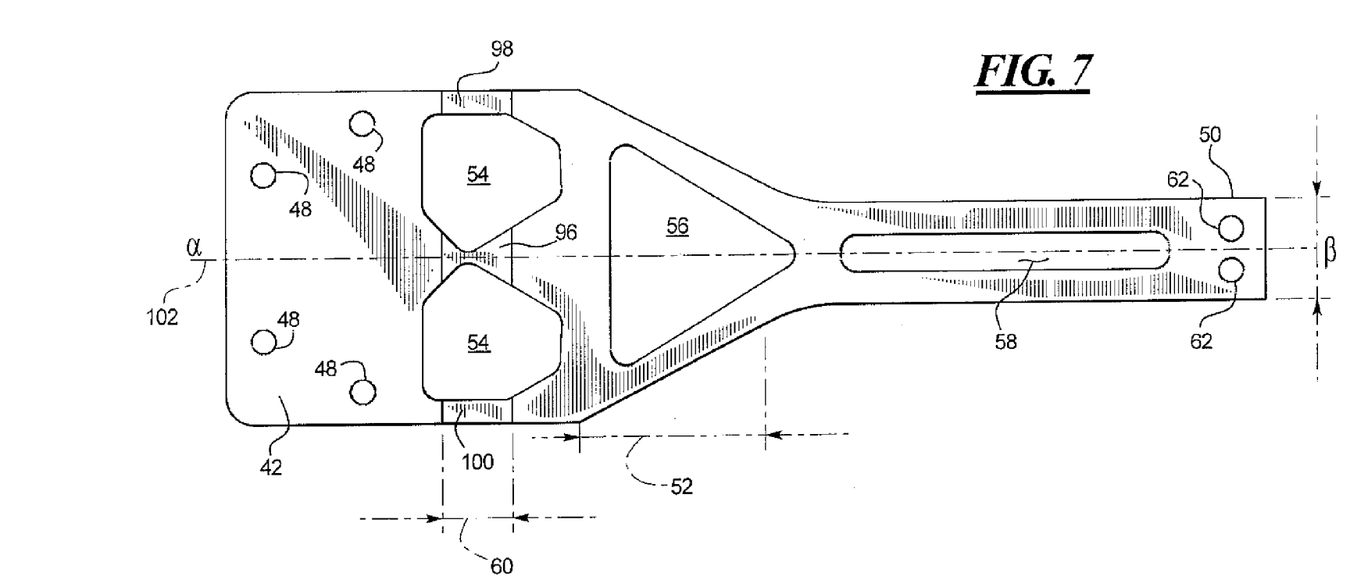
FIG. 7 is a plan view of a load cell constructed in accordance with the teachings of the disclosure.

Referring now not only to FIG. 1, but to FIG. 7 as well, it can be seen that the load cell 30 is of a specific geometry and relative dimensions. As will be described in further detail herein, the geometry and relative dimensions have been selected for multiple reasons including the prevention of torsional forces at the distal end 50 being transmitted back to the proximal end 42 and thus inaccurately effecting the measurements made by the instrument 22. In addition, the geometry of the load cell 30 acts to concentrate the biaxial forces resulting from the normal and shearing strains on the load cell 30 thus making for measurements of minute loads more readily attainable.

More specifically, the load cell 30 is shown to include the aforementioned proximal end 42 and distal end 50 of substantially different widths $\alpha$ and $\beta$, respectively. The distal end 50 is narrower than the proximal end 42 and separated therefrom by a central section 52 which tapers from the proximal end 42 to the distal end 50. The load cell 30 further includes a number of removed areas or cut-outs, with the proximal end 42 including two six-sided polygonal cut-outs 54, while the central section 52 includes a triangular cut-out 56 and the distal end 50 includes a rectangular cut-out 58. Through the use of such a web-like structure, positioning the cut-outs appropriately, and providing the mounting end at a wider dimension than the measuring end, stresses can be concentrated, and thus measured more effectively. In other words, when in use, the distal end 50 of the load cell 30 deflects and the resulting strain placed on the load cell 30 is transmitted back and concentrated at specific locations in the proximal end 42 where strain gauges described later herein are mounted. While the embodiment depicted includes the aforementioned six-sided, triangular and rectangular cut-outs, it is to be understood that while effective, other shapes are included within the scope of this disclosure.

Figure 10:
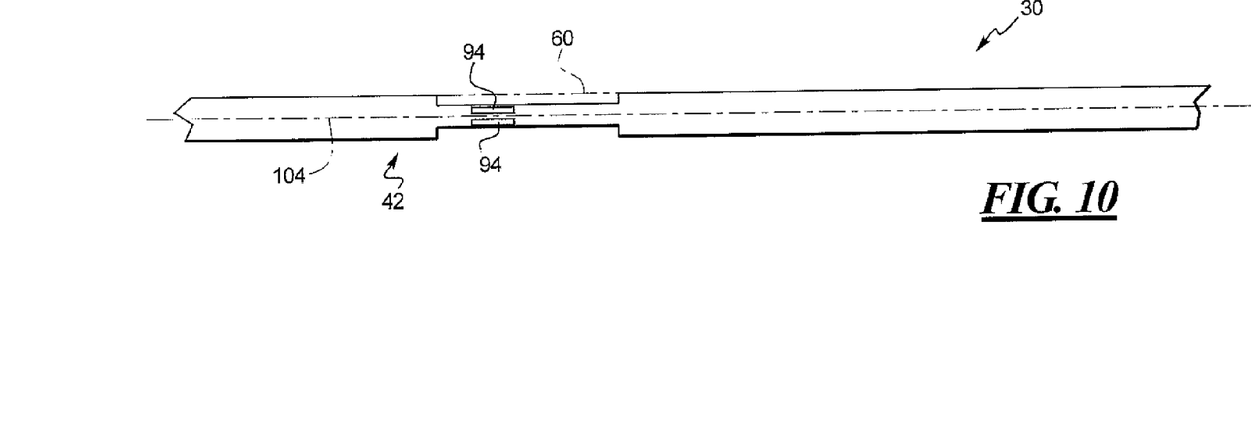
FIG. 10 is a partial top view of the proximal end of the load cell showing the location of additional strain gauges attached thereto.

Looking to the top view of the load beam of FIG. 10, it can be seen that the dimension of the load cell 30 also varies in thickness. More particularly, the load cell 30 includes a uniform thickness but for a concentration zone 60 which extends through the proximal end 40 in alignment with the polygonal cut-outs 54. As will be pointed out in more detail herein, this reduction in thickness of the load cell 30 also contributes to the concentration of the biaxial stresses and thus enables more accurate measurement of very low coefficients of function or other low level loads. While the dimensions of the load cell 30 can be altered, certain dimensions are particularly important to ensure non-torsional effects, and the ability to resolve anisotropic loadings. The symmetry of the load cell 30 and the relative positions and relationships within and between the cut-outs 54-58 also assists in this regard. Another important dimension is the thickness of the concentrate zone

60. If the concentration zone 60 is made thicker, more stability against normal and torsional loads is achieved, but at the expense of shear load resolution. Conversely, if the concentrate zone 60 is made thinner, the ability of the load cell 30 to measure shear loads with accuracy increases, but the load cell would be less able to withstand normal loads. By way of example, the load cell 30 may have a thickness of 1.59 millimeters while the concentration zone 60 may have a thickness of 0.99 millimeters, but other dimensions are certainly possible.

Figure 2:
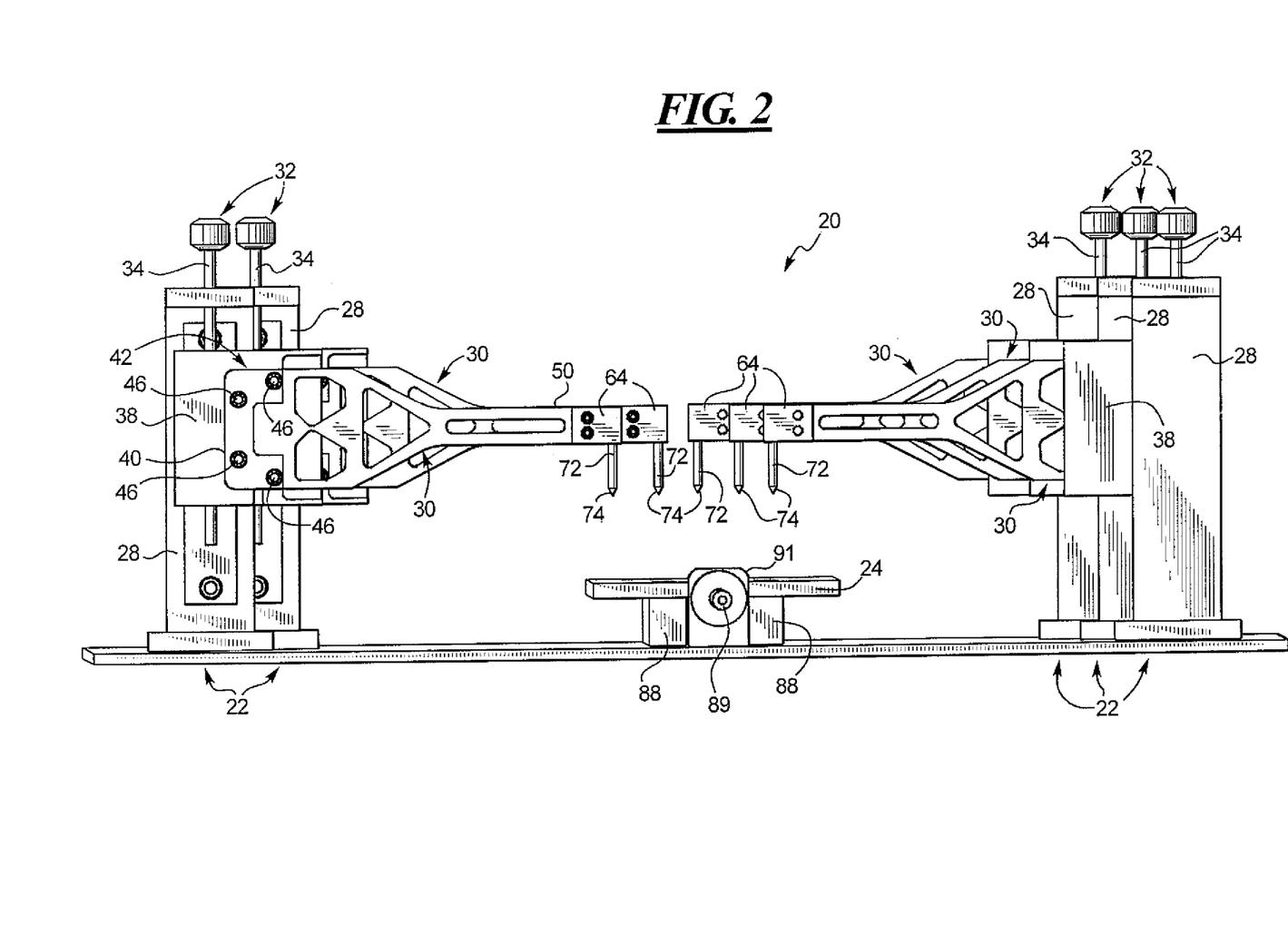
FIG. 2 is a side view of the measurement system depicted in FIG. 1.
Figure 3:
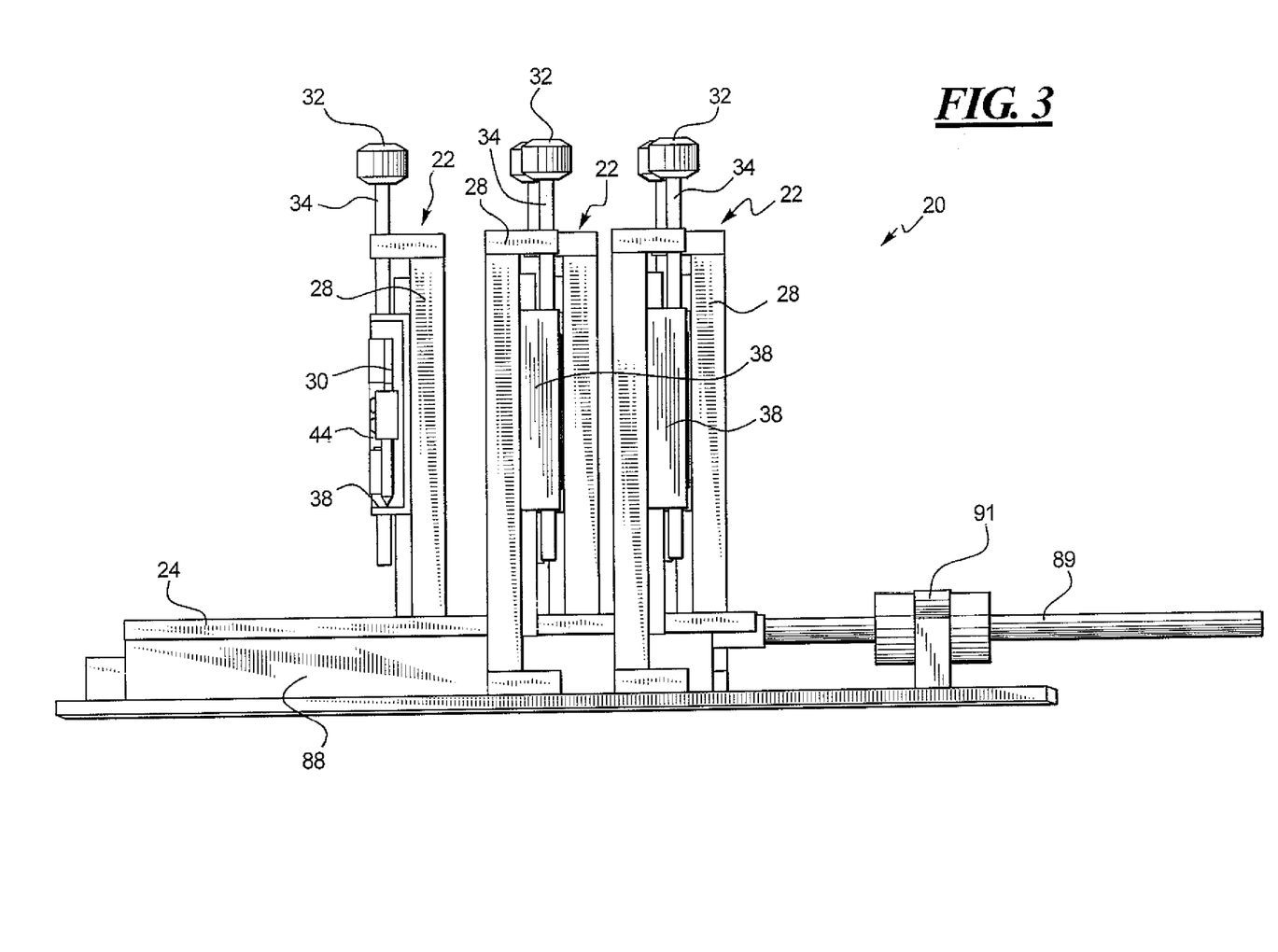
FIG. 3 is an end view of the measurement system depicted in FIG. 1.
Figure 4:
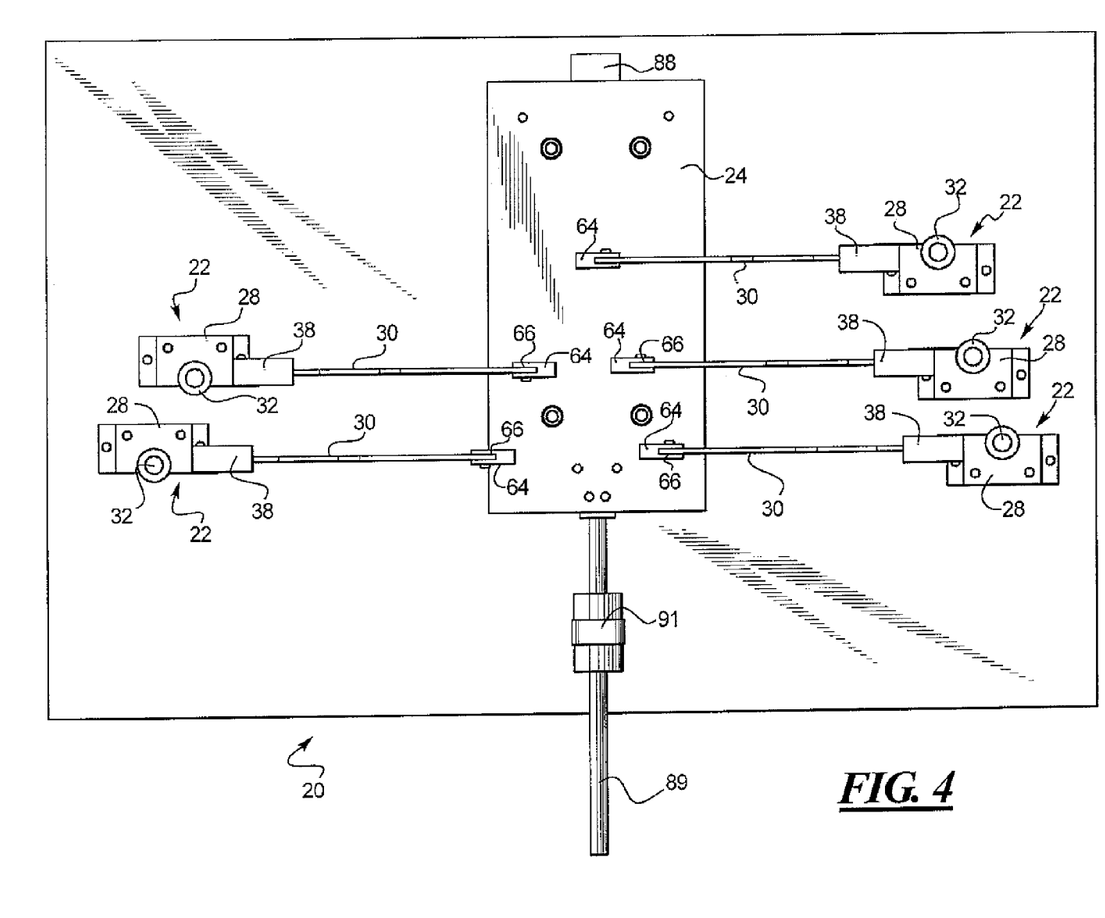
FIG. 4 is a top view of the measurement system depicted in FIG. 1.

Referring now to the distal end 50 of the load cell 30, it can be seen that it further includes a plurality of thru-holes 62 which facilitate attachment of pin mounting shoe 64. More specifically, the mounting shoe 64 can be seen to include a longitudinal groove 66 for receipt of the distal end 50. By providing thru-hole 68 through the shoe 64 as well, fastener's 70 can be used to attach the shoe securely to the load cell 30. Extending from the shoe 64 is a pin 72 having a rod-like overall configuration terminating in a conical tip 74 (see FIG. 2). In alternative embodiments, the shoe 64 and pin 72 may be integrally formed with the load cell 30 or otherwise connected thereto as by welding, adhesives, or the like.

Figure 5:
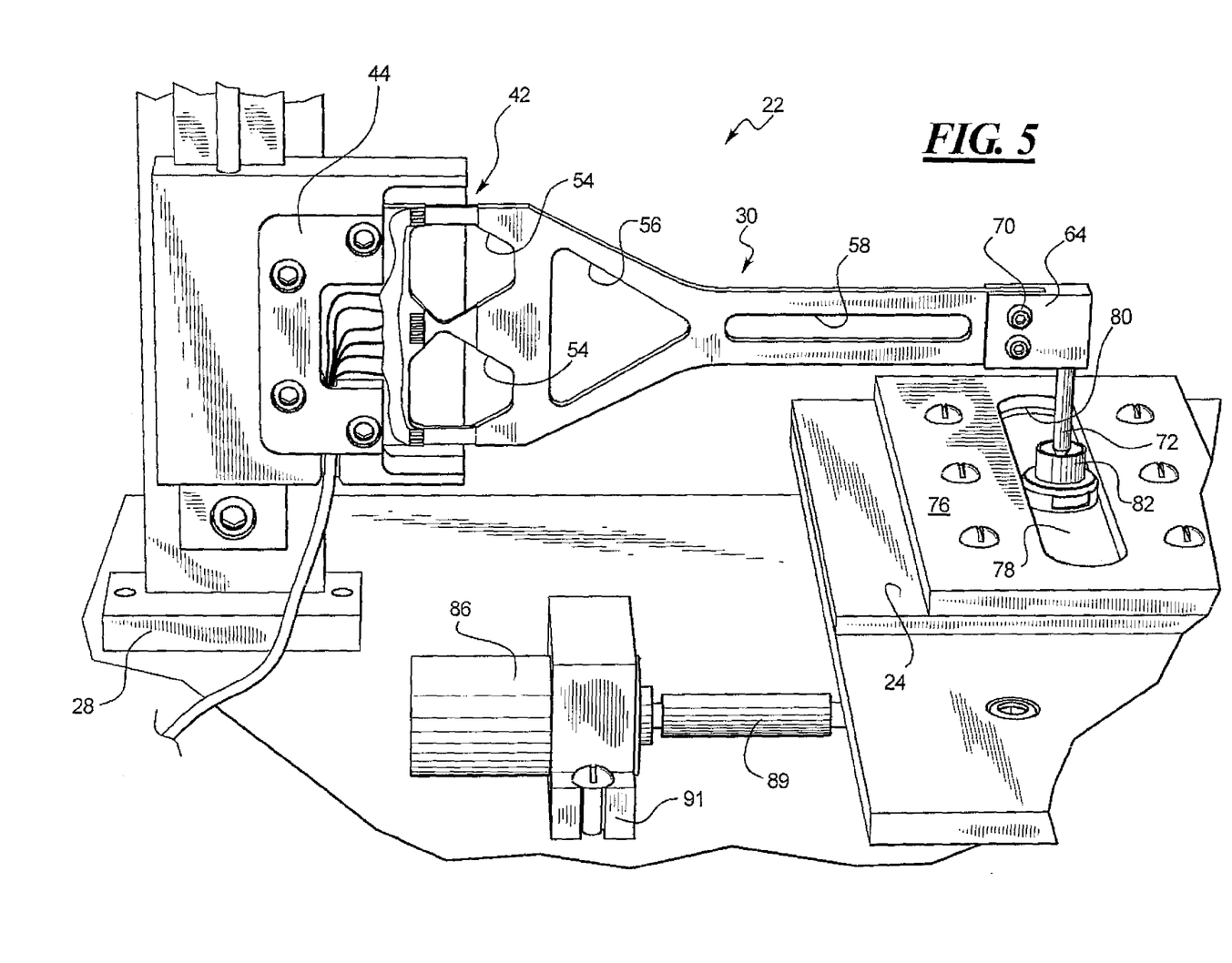
FIG. 5 is a perspective view of one load cell and measurement sample constructed in accordance with the teachings of the disclosure.

Referring now to FIG. 5, a single load cell 22 operating in conjunction with a measurement sample is provided in more detail. As shown therein, the table 24 includes a polymeric slab 76 attached to the glass surface of the measurement table 24. The polymeric slab includes an elongate slot or well 78 allowing for movement of the measurement sample therein. The well 78 is filled with a lubricant of interest to be measured and sealed against both the glass of the measurement table 24 and the inside surface of the well 78 by way of an elastomeric seal or gasket 80

Figure 6:
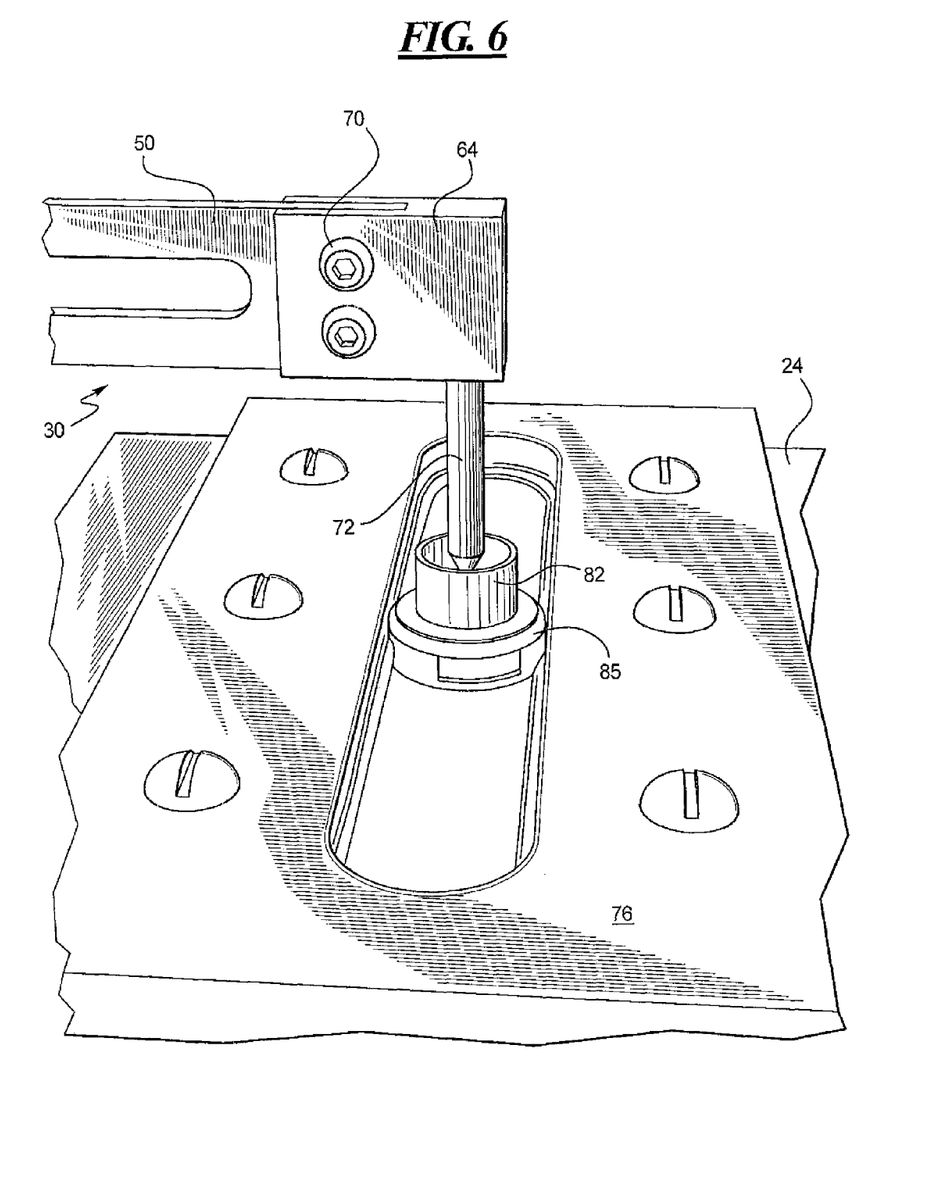
FIG. 6 is an enlarged perspective view of the measurement sample and end portion of the load beam of FIG. 5.

It can also be seen from FIG. 5, as well as FIG. 6, that the sample is attached to a sample holder 82 which may be provided in brass or some other suitable material. The sample of cartilage is glued or otherwise adhered to a bottom surface 85 of the sample holder 82. The sample holder 82 further includes a conical depression (not shown) into which the conical tip 74 of the pin 72 fits loosely, and thus ensures that pin 72 moves wherever the sample holder 82 moves. Such a loose fit is important in that it allows no rotational moments to be applied to the sample, but rather only compressive loads and resulting shearing loads. In one embodiment, the conical depression has an angle roughly two times that of the conical tip 74 of the pin 72.

As also shown in FIG. 5, the table 24 itself is mounted for movement at the direction of motor 86. The table 24 can be so mounted upon rails 88 or the like to allow for longitudinal, lateral, and vertical movement i.e., three-axis movement. Accordingly, it can be seen that when the motor 86 is activated, a shaft 89 connected to the motor 86 and mounted within pillow block 91 moves causing the table 24 to move as desired. While not shown, an electronic drive or programmable logic controller may be used to coordinate movement of the motor 86, as well as provide closed loop feedback by way of position sensors that the desired movement has been attained. One of ordinary skill in the art will understand many activating mechanisms can be employed to move the table 26 including, but not limited to, piezoelectric linear actuators, geared motors coupled to rack and pinion drive arrangements, and the like.

As the cartilage sample rests within lubricant well 92, movement of the table 24 causes the sample to move accordingly. Any resistance to that movement, depending upon the characteristics of the lubricant and the cartilage itself, is transmitted by way of first the sample holder 82, then to the pin 72, then to the pin mounted shoe 64, and then to the load cell 30.

Such deflection of the distal end 50 will result in either normal or shearing strains which the measurement system 20 is designed to measure. Moreover, by way of the unique geometry of the load cell 30 itself, such strains are concentrated at predetermined locations, so as to make measurement of even minute coefficients of function possible, when strain gauges 94 are mounted at those locations.

Figure 8:
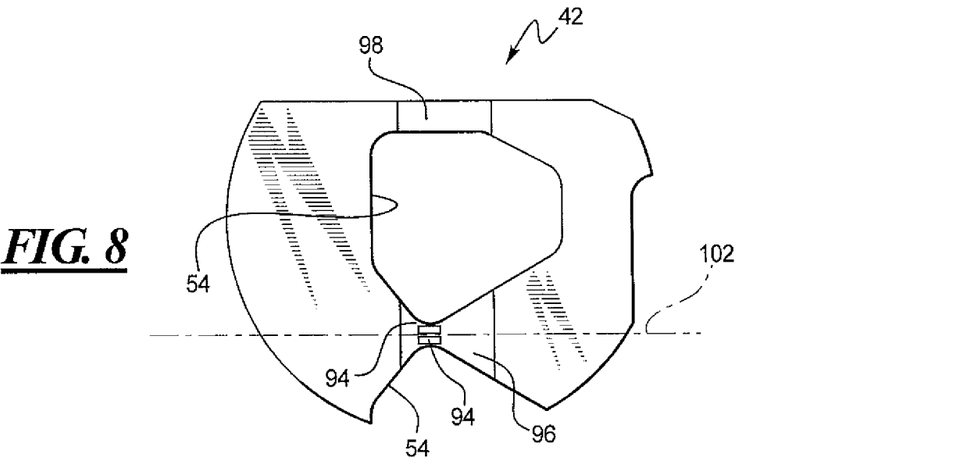
FIG. 8 is an enlarged plan view of the proximal end of the load cell of FIG. 7.
Figure 9:
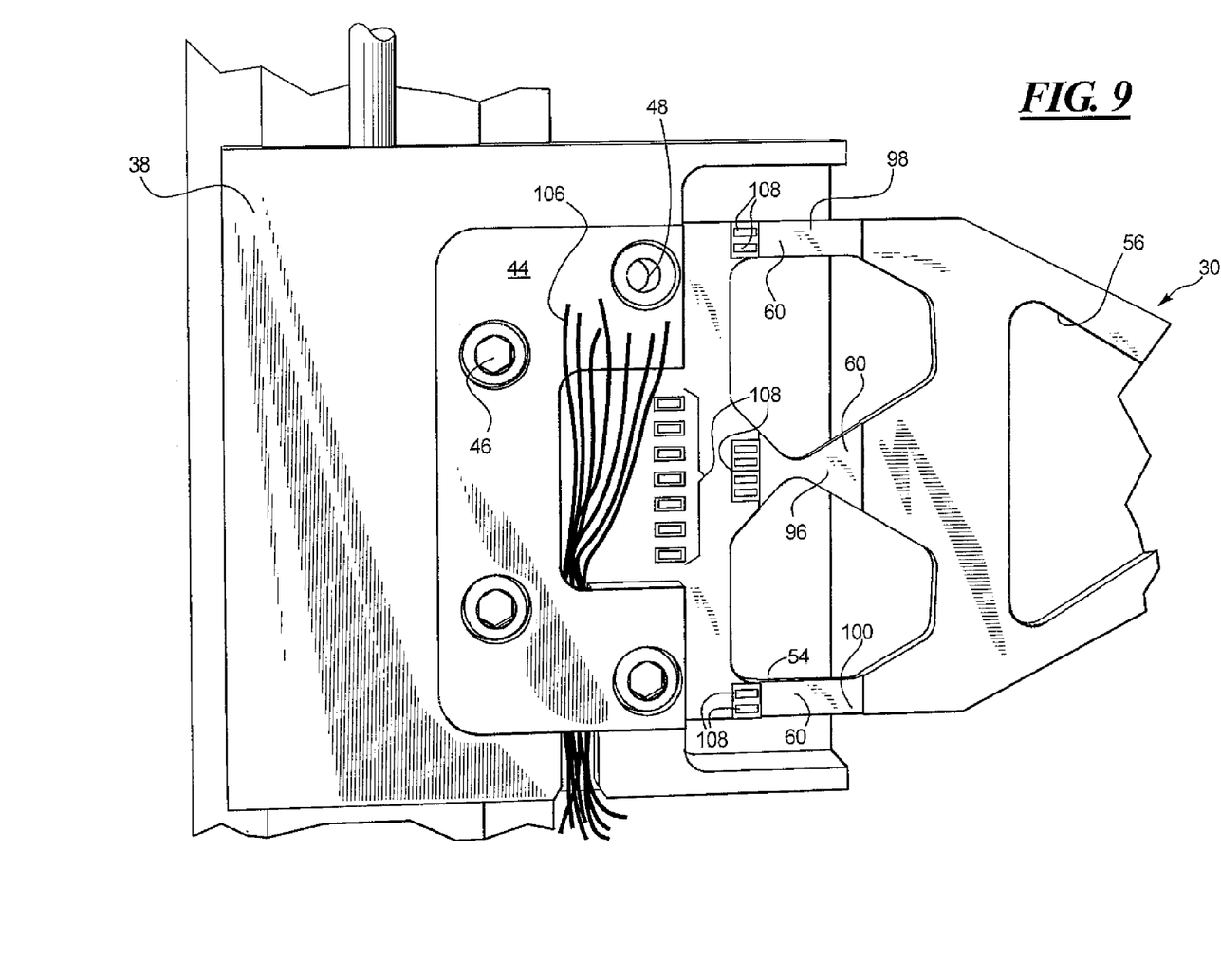
FIG. 9 is a plan view of the proximal end of the load cell showing the location of strain gauges attached thereto.

Referring now to FIGS. 8-10, the particular locations of the strain gauges 94 are described in detail. While any number of different types of strain gauges can be used, the preferred embodiment of the pending disclosure uses. Wheatstone bridges positioned in four different locations upon the load cell 30. Particular model numbers which can be used are SS-060-022-500P and SS-060-033-2008V manufactured by Micron Instruments, but other types of strain gauges, which may or may not be Wheatstone bridges, can be used as well. As will be noted from FIGS. 9 and 10, the strain gauges 94 are mounted within the concentration zone 60. Both the reduced thickness of the concentration zone 60 and the unique geometry of the load cell 30 concentrate stresses from the distal end 50 back through the central section 52 and to the proximal end 42. These stresses are further concentrated by the provision of, and the unique shape of, the relatively large polygonal cut-outs 54 within the concentration zone so as to concentrate the stresses both at a central strip 96, top web 98, and bottom web 100.

As is conventional, the strain gauges 94 are adhered to the concentration zone 60 by way of an epoxy so as to ensure transmission of the strain of the distal end 50 through the strain gauges 94, themselves. Moreover, the strain gauges 94 are mounted, as can be seen in FIGS. 9 and 10 about mid-lines 102 and 104 dissecting the load cell 30. More specifically, first with respect to FIG. 9, a mid-line 102 dissecting the load cell along a horizontal axis runs directly between the mid-section of the strain gauge 94. Similarly, the mid-line 104 which divides the thickness of the load cell 30, runs between strain gauges 94 as well. In so symmetrically mounting the strain gauges, more accurate measurements, such as for example of the coefficients of function of articular cartilage can be attained. Once connected as shown in FIG. 9, leads 106 are connected, as by soldering, to the strain gauges 94, with mounting pads 108 being provided to facilitate such attachment.

Figure 11:
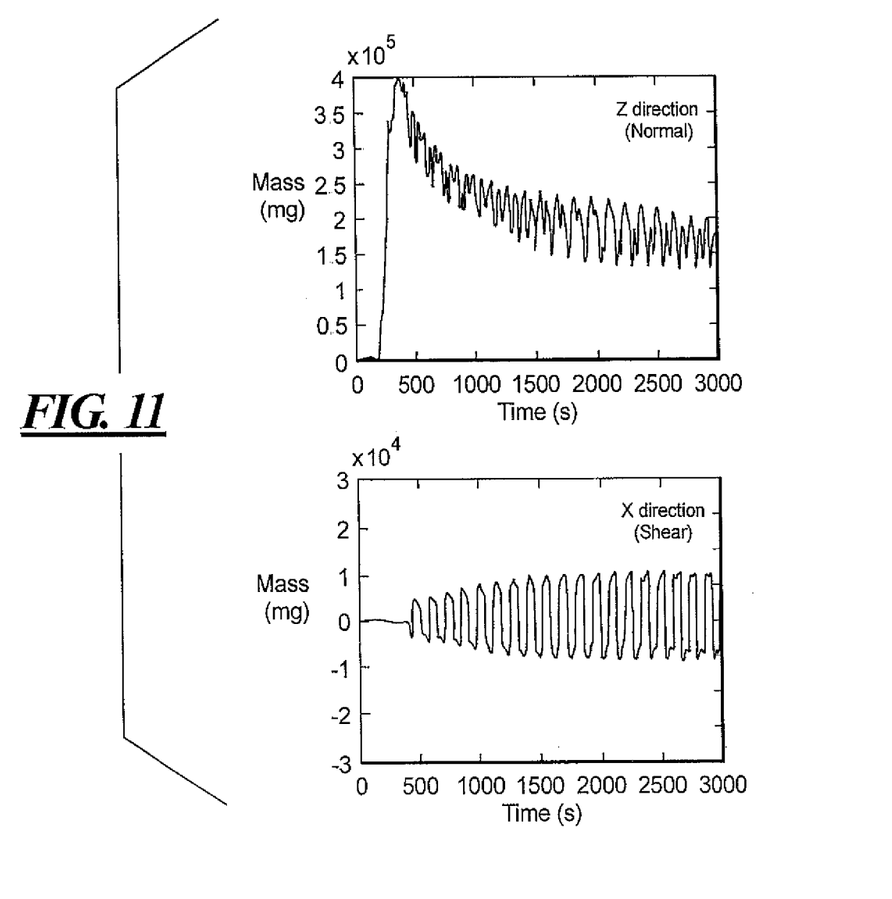

As indicated above, the Wheatstone bridges are comprised of semiconductor strain gauges bonded on to the surface of the load cell 30 at specific locations. The high resistance and gauge factors of the strain gauges allow for minute strains to be detected. That corresponding strain data, in the form of a voltage, is collected, and a decoupling algorithm is run on the data to distinguish the forces applied in the normal and shearing directions. Samples of the decoupled raw data in both the shearing and normal directions can then be chatted as shown, by way of example only, in FIG. 11. This data reflects the linear translation of the table 24 with a constant frequency, and behavior consistent with the sample tested against glass. The design of the system enables standard excitation voltages and any commercially available signal conditioning equipment to be used to collect the data.

The fact that bending of the beam occurs in two dimensions requires that care must be taken to overcome the mutual interaction of the two applied loads with respect to the strain that is measured with the strain gauges mounted on the load cell. The aforementioned decoupling algorithm is therefore used. The load cell is calibrated using known masses applied in one or both directions simultaneously. The voltages from the transducers (strain gauges) due to the applied load, when taken together, represent a unique loading. Due to the elastic nature of the material of the beam (aluminum), a linear relationship can be created to relate the output voltages to applied loads using the following equation:

$$\begin{bmatrix} L_{Shear} \\ L_{Normal} \end{bmatrix} = \begin{bmatrix} k_{11} & k_{12} \\ k_{21} & k_{22} \end{bmatrix} \begin{bmatrix} V_{Shear} \\ V_{Normal} \end{bmatrix}$$

where matrix L is the respective loads;
matrix V is the respective output voltages from the load cell; and
matrix k is the decoupling coefficient matrix allowing a unique shear and normal load to be calculated from the output voltages for a particular load cell.

In one preferred embodiment, the measurement system is designed to measure forces that are up to 1,000 times greater in a normal direction of (Z axis) as shown in FIG. 1, as opposed to a shearing direction (X axis) shown in FIG. 1 as well. The load ranges in each direction enable the effective measurement of coefficients of friction or anisotropy index from $3 \times 10^{-6}$ to 250. The range of friction coefficients which is able to be measured is also dependent on the specifics of the signal conditioning protocol, and this range may be even wider than described herein. Again, coefficients of frictions are but one example of an anisotropic biaxial load which may be measured by the load cell 30.

Based on the foregoing, it can be seen that the present disclosure provides a measuring device with significant advantages over known load cells. One advantage is that separate load cells need not be used for each direction of measurement in that each load cell 30 is able to measure biaxially making the system less bulky and less expensive to manufacture. Additionally, since a normal load can be applied with the disclosed load cell, the ability arises to have multiple load cells in parallel, as shown in FIG. 1, testing samples simultaneously on one common substrate. The ability to test samples in parallel significantly cuts down on experiment time and cost of the production of the unit. The system was also designed for the purposes of characterizing tribology where there are normally anisotropic properties. In addition to characterization of frictional properties, the load cell also has applications in many other areas including, but not limited to, tissue engineering bioreactors. Due to the ability to apply loads through translation of the load cell, the ability exists to impose known normal strains allowing for the ability to measure tissue samples with very different material properties.

While the foregoing was written with reference to specific examples and embodiments, it is to be understood that the scope of the invention is not to be limited thereby, but rather are provided to satisfy best mode and enablement requirements while providing support for any and all claims which may issue herefrom.

We claim:

1. A load cell measurement system, comprising:
a platform;
a movable table mounted on the platform;
a plurality of load cells extending upwardly from the platform, each of the load cells including: a tower extending upwardly from the platform; a beam extending from the tower, the beam including a base, a tapered section extending from the base, and an arm extending from the tapered section, each of the base, tapered section and arm including cut-out sections, the base including top, central, and bottom strips; and
strain gauges mounted on the top, central, and bottom strips of the base; and
a processor connected to the strain gauges and adapted to execute an algorithm based on signals received from the strain gauges.

2. The load cell measurement system of claim 1, further including a movable carriage on each tower, each beam extending from one of the carriages.

3. The load cell measurement system of claim 2, wherein each carriage is threadedly attached to the tower and thereby lineally translatable up and down the tower.

4. The load cell measurement system of claim 1, wherein the cut-out in the arm is a linear slot, the cut-out in the tapered section is a triangular opening, and the cut-outs in the base are first and second openings separated by a central strip and flanked by first and second outer strips.

5. The load cell measurement system of claim 4, wherein the first and second openings in the base include pointed sections forming a narrow neck in the central strip thereby concentrating strain in the neck.

6. The load cell measurement system of claim 1, wherein the strain gauges are attached with epoxy.

7. The load cell measurement system of claim 1 further including a mounting shoe attached to the arm.

8. The load cell measurement system of claim 7, further including a pin downwardly extending from the mounting shoe.

9. The load cell measurement system of claim 1, wherein the processor executes the following decoupling algorithm:

$$\begin{bmatrix} L_{Shear} \\ L_{Normal} \end{bmatrix} = \begin{bmatrix} k_{11} & k_{12} \\ k_{21} & k_{22} \end{bmatrix} \begin{bmatrix} V_{Shear} \\ V_{Normal} \end{bmatrix}$$

where matrix L is respective loads, matrix V is respective output voltages from the load cell, and matrix k is a decoupling coefficient matrix allowing a unique shear and normal load to be calculated from the output voltages for a particular load cell.

10. The load cell measurement system of claim 1, wherein the strain gauge is a Wheatstone bridge.

11. The load cell measurement system of claim 1, wherein the top, central, and bottom strips of the base define a concentration zone, the concentration zone being of a thinner dimension than a remainder of the beam.

12. The load cell measurement system of claim 1, wherein the load cell is adapted to measure loads in at least two directions, the measurement in the first direction being of a different resolution than the measurement in the second direction.

13. A load cell measurement system comprising:
a platform;
a movable table mounted on the platform;
a plurality of load cells extending upwardly from the platform, each of the load cells including: a tower extending upwardly from the platform; a beam extending from the tower, the beam including a base, a tapered section extending from the base, and an arm extending from the tapered section, each of the base, tapered section and arm including cut-out sections, the base including top, central, and bottom strips;
the arm being of a lesser width than the base, the base, tapered section and arm each including cut-out sections;
strain gauges mounted on the top, central, and bottom strips of the base; and a processor connected to the strain gauges and adapted to execute an algorithm based on signals received from the strain gauges.

14. The load cell measurement system of claim 13, wherein the cut-out in the arm is a lineal slot, and the cut-out in the tapered section is a triangular opening.

15. The load cell measurement system of claim 13, further including a mounting shoe attached to each arm.

16. The load cell measurement system of claim 15, further including a pin downwardly extending from the mounting shoe.

17. The load cell measurement system of claim 13, wherein the processor executes the following decoupling algorithm:

$$\begin{bmatrix} L_{Shear} \\ L_{Normal} \end{bmatrix} = \begin{bmatrix} k_{11} & k_{12} \\ k_{21} & k_{22} \end{bmatrix} \begin{bmatrix} V_{Shear} \\ V_{Normal} \end{bmatrix}$$

where matrix L is respective loads, matrix V is respective output voltages from each load cell, and matrix k is a decoupling coefficient matrix allowing a unique shear and normal load to be calculated from the output voltages for a particular load cell.

18. The load cell measurement system of claim 13, wherein each strain gauge is a Wheatstone bridge.

19. The load cell measurement system of claim 13, wherein first and second cut-outs are divided by a central strip.

20. The load cell measurement system of claim 19, wherein the first and second openings in the bases include pointed sections forming narrowed necks in the central strip thereby concentrating strain in the necks.

21. The load cell of claim 19, wherein a strain gauges is mounted on the central strip.

22. The load cell measurement system of claim 21, wherein the strain gauge is attached with epoxy.

23. The load cell of claim 19, wherein the central strip is of a thinner dimension than a remainder of the base.

24. The load cell measurement system of claim 13, wherein the load cell is adapted to measure loads in at least two directions, the measurement in the first direction being of a different resolution than the measurement in the second direction.

25. A single beam load cell measurement system adapted to measure loads in at least two directions, the measurement in the first direction being of a different resolution than the measurement in the second direction, the load cell measurement system comprising:

a platform;
a movable table mounted on the platform;
a plurality of load cells extending upwardly from the platform, each of the load cells including: a tower extending upwardly from the platform; a beam extending from the tower, the beam including a base, a tapered section extending from the base, and an arm extending from the tapered section, each of the base, tapered section and arm including cut-out sections, the base including top, central, and bottom strips; and
strain gauges mounted on the top, central, and bottom strips of the base; and
a processor connected to the strain gauges and adapted to execute an algorithm based on signals received from the strain gauges.

* * * * *